(12) United States Patent
Shen et al.

(10) Patent No.: US 9,784,430 B2
(45) Date of Patent: Oct. 10, 2017

(54) LENS AND LIGHTING DEVICE

(71) Applicant: PHILIPS LIGHTING HOLDING B.V., Eindhoven (NL)

(72) Inventors: Mo Shen, ShangHai (CN); Yun Li, Shanghai (CN); Aibin Zou, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/895,666

(22) PCT Filed: Jun. 4, 2014

(86) PCT No.: PCT/IB2014/061934
§ 371 (c)(1),
(2) Date: Dec. 3, 2015

(87) PCT Pub. No.: WO2014/195876
PCT Pub. Date: Dec. 11, 2014

(65) Prior Publication Data
US 2016/0138777 A1    May 19, 2016

(30) Foreign Application Priority Data

Jun. 7, 2013  (WO) ................ PCT/CN2013/076946

(51) Int. Cl.
*F21V 5/04*    (2006.01)
*G02B 19/00*    (2006.01)
(Continued)

(52) U.S. Cl.
CPC .............. *F21V 5/045* (2013.01); *F21K 9/233* (2016.08); *F21V 5/004* (2013.01); *F21V 17/164* (2013.01);
(Continued)

(58) Field of Classification Search
CPC ........ F21V 5/045; F21V 5/004; F21V 17/164; F21V 9/233
See application file for complete search history.

(56) References Cited

U.S. PATENT DOCUMENTS 7,580,192 B1 * 8/2009 Chu ......................... F21V 5/04
359/641
8,120,048 B2    2/2012 Chen et al.
(Continued)

FOREIGN PATENT DOCUMENTS

DE    102011084881 A1    4/2013
EP    1251366 A1    10/2002
JP    2011192494 A    9/2011

*Primary Examiner* — Anne Hines

(57) ABSTRACT

Disclosed is a lens (100) for a lighting device (10) comprising a solid state lighting element (20), the lens comprising a light exit surface (110); a central lens portion (120) opposite said light exit surface; an inner annular reflective element (130) opposite said light exit surface and extending away from said light exit surface by a first distance (d1), said inner annular reflective element delimiting said central lens portion; and a side surface defined by an outer annular reflective element (140) opposite said light exit surface and extending away from said light exit surface by a second distance (d2) that is larger than the first distance such that the outer annular reflective element extends beyond the inner annular reflective element. A lighting device such as a light bulb including such as lens is also disclosed.

13 Claims, 3 Drawing Sheets

(51) Int. Cl.
*F21V 17/16* (2006.01)
*F21V 5/00* (2015.01)
*F21K 9/233* (2016.01)
*G02B 3/08* (2006.01)

(52) U.S. Cl.
CPC ..... *G02B 19/0028* (2013.01); *G02B 19/0061* (2013.01); *G02B 3/08* (2013.01)

(56) References Cited

U.S. PATENT DOCUMENTS

| | | |
|---|---|---|
| 8,368,093 B2 | 2/2013 | Chen et al. |
| 2003/0202241 A1* | 10/2003 | Blumel .................. F21V 5/007 359/365 |
| 2009/0180286 A1* | 7/2009 | Bamba .................... F21V 5/045 362/297 |
| 2010/0284194 A1 | 11/2010 | Miyashita et al. |
| 2011/0310618 A1 | 12/2011 | Saito |
| 2014/0239336 A1* | 8/2014 | Streppel .................. F21V 5/045 257/98 |
| 2014/0316742 A1* | 10/2014 | Sun .................... G02B 19/0066 702/167 |

* cited by examiner

LENS AND LIGHTING DEVICE

CROSSS-REFERENCE TO PRIOR APPLICATIONS

This application is the U.S. National phase application under 35 U.S.C. §371 of International Application No. PCT/IB2014/061934, filed on Jun. 4, 2014, which claims the benefit of International Application No. PCT/CN2013/076946, filed on Jun. 7, 2013. These applications are hereby incorporated by reference herein.

FIELD OF THE INVENTION

The present invention relates to a lens for a lighting device comprising a solid state lighting element.

The present invention further relates to a lighting device comprising such a lens.

BACKGROUND OF THE INVENTION

With a continuously growing population, it is becoming increasingly difficult to meet the world's energy needs as well as to control carbon emissions to kerb greenhouse gas emissions that are considered responsible for global warming phenomena. These concerns have triggered a drive towards more efficient electricity use in an attempt to reduce energy consumption.

One such area of concern is lighting applications, either in domestic or commercial settings. There is a clear trend towards the replacement of traditional incandescent light bulbs, which are notoriously energy inefficient, with more energy efficient replacements. Indeed, in many jurisdictions the production and retailing of incandescent light bulbs has been outlawed, thus forcing consumers to buy energy-efficient alternatives, e.g. when replacing incandescent light bulbs.

A particular promising alternative is provided by solid state lighting (SSL) devices, which can produce a unit luminous output at a fraction of the energy cost of incandescent light bulbs. An example of such a SSL element is a light emitting diode.

A drawback of SSL element-based lighting devices is that individual SSL elements have a much lower luminous output than e.g. incandescent, tungsten halogen or fluorescent light bulbs, such that it is necessary to include multiple SSL elements in a single lighting device such as a light bulb to obtain the required luminous output levels. However, this is generally perceived to negatively affect the appearance of the lighting device, which hampers the market penetration of such lighting devices, although recently the emergence of so-called chip-on-board (COB) SSL elements, e.g. COB LEDs, in which multiple SSL chips are packaged together as one lighting module such that in use the luminous surface of the lighting device gives the appearance of a single lighting panel, have addressed this problem to a large extent.

Another problem hampering the penetration of the consumer markets by such lighting devices is that it is far from trivial to control the shape of the light output of such devices, at least in a cost-effective manner. This is a particular problem when a highly directional light output is required, e.g. a light bulb having a small beam angle, e.g. a beam angle of less than 30°. Beam angles can be controlled by the inclusion of optical elements such as Fresnel lenses and collimators into the lighting device. For instance, Japanese patent application with publication number JP 2011-192494 A discloses a Fresnel lens for a lighting system having a refractive lens portion and a reflective lens portion. The Fresnel lens further comprises a frame for placing the lens on a substrate of the lighting system.

However, an inverse correlation exists between the beam angle and the size of the optical elements required to achieve the desired beam angle. This means that for small beam angles, e.g. beam angles of 25° or 15°, large size beam shaping elements are required. In many small lighting devices such as compact light bulbs, there is insufficient space to accommodate optical elements such as the aforementioned prior art Fresnel lens.

SUMMARY OF THE INVENTION

The present invention seeks to provide a lens that can be used to generate highly directional light outputs in compact lighting devices.

The present invention further seeks to provide a lighting device comprising such a lens.

According to an aspect of the present invention, there is provided a lens for a lighting device comprising a solid state lighting element, the lens comprising a light exit surface; a central lens portion opposite said light exit surface; an inner annular reflective element opposite said light exit surface and extending away from said light exit surface by a first distance, said inner annular reflective element delimiting said central lens portion; and a side surface defined by an outer annular reflective element opposite said light exit surface and extending away from said light exit surface by a second distance that is larger than the first distance such that the outer annular reflective element extends beyond the inner annular reflective element.

At least some embodiments of the present invention are based on the insight that the outer annular reflective element of a lens having two of such annular elements, i.e. an inner annular reflective element delimiting a central lens portion such as a refractive lens portion and an outer annular element directly adjacent to the inner annular element, can be used as a support for the lens. Consequently, when the lens is placed on a surface carrying one or more SSL, the outer annular reflective element not only supports the lens but also envelopes the luminous surface defined by the one or more SSL elements. As the lens does not require a separate support structure, the lens can be made in a compact fashion such that it can be fitted in compact lighting devices such as directional light bulbs.

Also, because the outer annular reflective element is designed to mate with a support of the lighting device, light emitted from the SSL elements under shallow angles can still be harvested and collimated. It is noted that the Fresnel lens of JP 2011-192494 A does not share this advantage as the outer reflective portion of this lens has a clearance between its extremity facing the surface of the lighting device and this surface due to the fact that the support member of this lens extends towards this surface to a point beyond the outer reflective portion, i.e. it is the support member that mates with this surface. Consequently, light emitted at shallow angles may not be captured by the outer reflective portion but may be captured by the support member instead, which is incapable of collimating this light. Consequently, the lens according to at least some embodiments of the present invention achieves a higher degree of collimation than this prior art lens.

In an embodiment, the central lens portion has a convex surface. The convex surface achieves a collimation of incident light towards the central axis of the lens, thereby achieving a more focussed appearance.

The central lens portion may comprise a Fresnel refractive surface.

In an embodiment, at least one of the inner annular reflective element and the outer annular reflective element comprises a tapered outer surface defined by a plurality of rings of facets to improve the colour mixing of the lens. In addition, such faceted rings can be used to reduce the overall height of the lens at the expense of an increase in diameter.

The light exit surface may comprise a stepped profile to reduce the overall height of the lens, thereby making it even more suitable for integration in compact lighting device.

The light exit surface may be textured and/or the lens may comprise a microlens array on said light exit surface to reduce the colour over angle (COA) variation of the lens.

The lens may be made of a polymer material such as (an optical grade) polycarbonate or poly(methyl methacrylate) such that the lens can be manufactured by low cost techniques such as injection moulding.

According to another aspect of the present invention, there is provided a lighting device comprising at least one solid state lighting element and the lens according to an embodiment of the present invention placed over the at least one solid state lighting element such that the outer annular reflective element is in contact with a surface of the lighting device, wherein a luminous surface area of the solid state lighting element is enclosed by the outer annular reflective element.

This provides a compact lighting device with highly efficient collimation characteristics capable of generating a narrow light beam of less than 20°, such as 15° or less.

In an embodiment, the luminous surface area extends beyond the central lens portion. This is feasible because of the physical contact between the outer annular reflective element and the surface of the light bulb, such that a hermetically sealed cavity is formed in which the luminous output is transmitted. Consequently, all emitted light is harvested by the lens, thereby yielding a lighting device having a high luminous flux in combination with the aforementioned narrow beam angle.

The lighting device may comprise a cavity over said at least one solid state lighting element, said cavity housing said lens.

The at least one SSL element may be a light emitting diode (LED). A chip on board (COB) SSL element such as a COB LED is particularly preferred as such SSL elements produce a high luminous output that is homogeneous in appearance, which is aesthetically pleasing.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
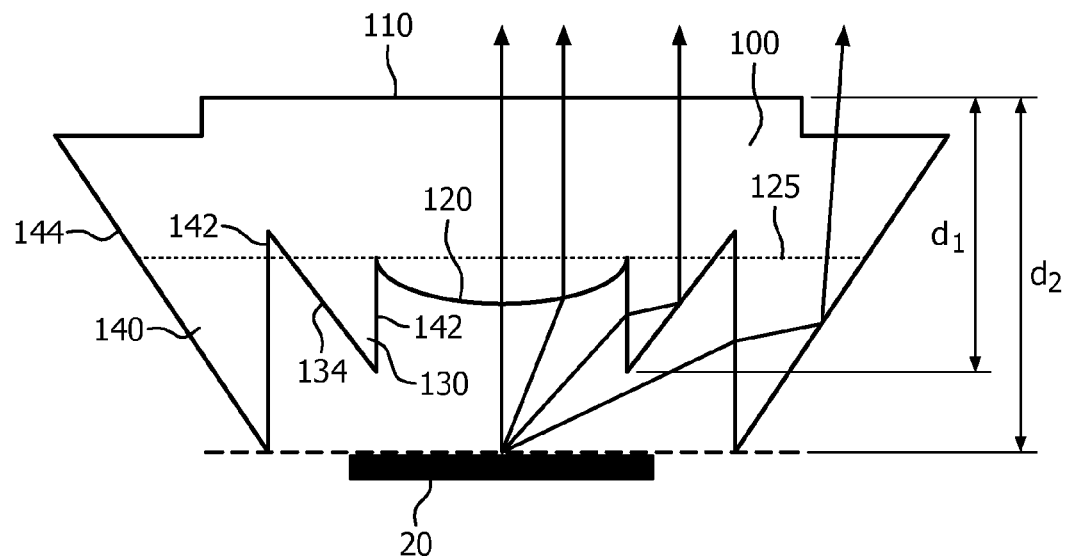
FIG. 1 schematically depicts a lens according to an embodiment of the present invention.

It should be understood that the Figures are merely schematic and are not drawn to scale. It should also be understood that the same reference numerals are used throughout the Figures to indicate the same or similar parts.

FIG. 1 schematically depicts a lens 100 according to an embodiment of the present invention. The lens 100 comprises a light entry surface defined by a central lens portion 120, an inner annular reflective element 130 and an outer annular reflective element 140 defining the side surface of the lens 100. The lens 100 further comprises a light exit surface 110 opposite the light entry surface. In use, the light entry surface of the lens 100 typically faces a light source such as a surface comprising one or more solid state lighting (SSL) elements 20 such as light emitting diodes. In an embodiment, the inner annular reflective element 130 and the outer annular reflective element 140 are directly adjacent to each other, i.e. the lens 100 comprises no more than two of such annular elements.

The inner annular reflective element 130 and the outer annular reflective element 140 each extend away from the light exit surface 110 towards the surface carrying the SSL element(s) 20. The inner annular reflective element 130 extends away from a portion of the light exit surface 110 by a distance d1, whereas the outer annular reflective element 140 extends away from this portion by a distance d2, wherein d2 is larger than d1. In other words, the outer annular reflective element 140 extends past the plane 125 of the central lens portion 120 by a larger amount or distance than the inner annular reflective element 130. Consequently in use the outer annular reflective element 140 may contact the surface carrying SSL element(s) 20 whereas a clearance remains between the inner annular reflective element 130 and this surface.

The inner annular reflective element 130 has an inner surface 132 and an outer surface 134. The outer annular reflective element 140 has an inner surface 142 and an outer surface 144. The respective inner surfaces 132 and 142 of the inner annular reflective element 130 and the outer annular reflective element 140 are angled such that incident light from the SSL element(s) 20 is incident at an angle below the critical angle of reflection, such that the majority of the incident light will travel into the inner annular reflective element 130 and the outer annular reflective element 140 respectively. It will be readily understood by the skilled person that a minor amount of reflection may be difficult to avoid.

The respective outer surfaces 134 and 144 of the inner annular reflective element 130 and the outer annular reflective element 140 are angled such that incident light from the SSL element(s) 20 travelling through the inner annular reflective element 130 and outer annular reflective element 140 respectively coincides with these surfaces at an angle above the critical angle of reflection, thereby reflecting the light towards the light exit surface 110 as shown by the arrows in FIG. 1. In other words, the respective outer surfaces 134 and 144 of the inner annular reflective element 130 and the outer annular reflective element 140 are total internal reflection surfaces. Consequently, the inner annular reflective element 130 and the outer annular reflective element 140 act as an inner collimator and an outer collimator respectively for the light emitted by the SSL element(s) 20.

The respective outer surfaces 134 and 144 of the inner annular reflective element 130 and the outer annular reflective element 140 may be smooth surfaces or may be multi-faceted surfaces in which the surface is built up by a plurality of arcuate segments each comprising a plurality of facets. This improves the colour mixing and beam shaping by the lens 100.

In an embodiment, the respective outer surfaces 134 and 144 of the inner annular reflective element 130 and the outer annular reflective element 140 are shaped such that the light redirected by these surfaces vertically exits the light exit surface 110, i.e. exits the light exit surface 110 perpendicular to the plane of this surface.

In an embodiment, the central lens portion 120 may have a convex shape such that the incident light refracted by the central lens portion 120 vertically exits the light exit surface 110, i.e. exits the light exit surface 110 perpendicular to the plane of this surface. This embodiment thus provides a lens 100 generating a highly collimated output, especially when combined with respective outer surfaces 134 and 144 of the inner annular reflective element 130 and the outer annular reflective element 140 are shaped such that the light redirected by these surfaces also vertically exits the light exit surface 110. In this case, the lens 100 may produce a collimated light output with beam angles as low as 15°. It should be understood that it is equally feasible that alter the shape of the light output by altering the shape of the central lens portion 120 and/or the respective outer surfaces 134 and 144 of the inner annular reflective element 130 and the outer annular reflective element 140, for instance to produce a light output that is focussed towards the central axis of the lens 100. This is known per se and will not be explained in further detail for the sake of brevity only.

In an embodiment, the overall dimensions of the lens 100 are such that a typical luminous area of the SSL element(s) 20 extends beyond the inner surface 132 of the inner annular reflective element 130, as is schematically shown in FIG. 1. In this embodiment, the outer annular reflective element 140 is arranged to collect the light emitted from the portion of this luminous area that lies beyond the inner surface 132 of the inner annular reflective element 130 as well as the light emitted from this luminous area under shallow angles such that this light passes through the clearance between the inner annular reflective element 130 and the surface carrying the SSL element(s) 120.

Additionally, the outer surface 144 of the outer annular reflective element 140 defines the side surface of the lens 100, i.e. the lens 100 does not contain a separate supporting member. Instead, the outer annular reflective element 140 also acts as the supporting member of the lens 100.

The lens 100 may be manufactured in any suitable manner and from any suitable material. A particularly suitable manufacturing method is injection moulding using polymer materials such as (optical grade) polycarbonate or PMMA. Other suitable polymer materials will be apparent to the skilled person.

Figure 2:
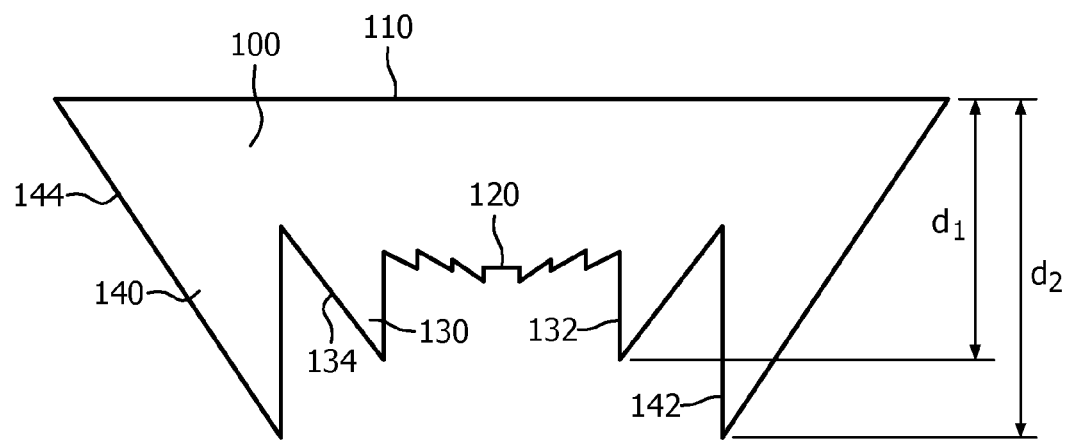
FIG. 2 schematically depicts a lens according to another embodiment of the present invention.

In FIG. 1 the lens 100 has a light exit surface 110 with a stepped profile. This is to further reduce the overall size of the lens 100, i.e. to produce a more compact lens 100. However, it should be understood that the light exit surface 110 may have any suitable shape. For instance, FIG. 2 depicts an embodiment of the lens 100 in which the light exit surface 110 is a planar surface, but other surface shapes, e.g. a curved shape are equally feasible. Similarly, the central lens portion 120 may have any suitable shape, such as a Fresnel surface as shown in FIG. 2.

Figure 3:
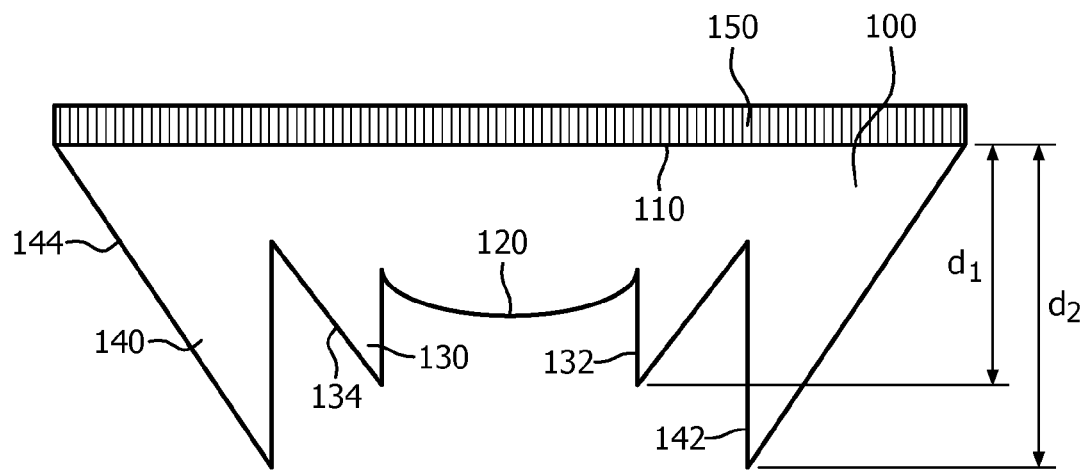
FIG. 3 schematically depicts a lens according to yet another embodiment of the present invention.

The light exit surface 110 may be a plain or clear surface. Alternatively, the light exit surface 100 may be textured or may carry an optical element such as a microlens array 150 as shown in FIG. 3 to improve the COA of a lighting device including the lens 100. This is particularly relevant if the lighting device produces white light of different colours (at different output angles) such that the texturing of the light exit surface 100 or the presence of an optical element such as the microlens array 150 on the lens 100 in FIG. 3 improves the homogeneity of the white light output of the lens 100 due to enhanced mixing of such different coloured light, e.g. through scattering.

Figure 4:
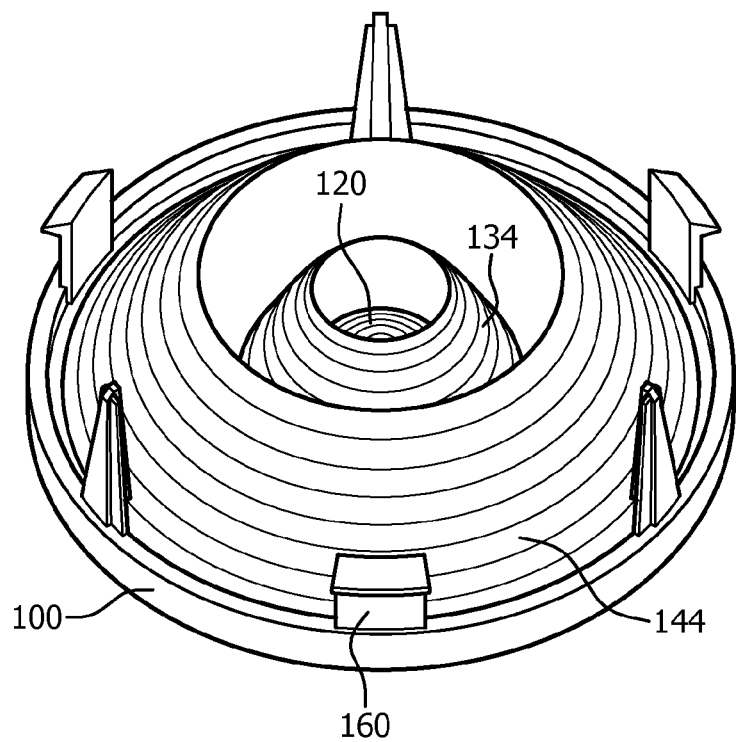
FIG. 4 schematically depicts a first perspective view of a lens according to an embodiment of the present invention.
Figure 5:
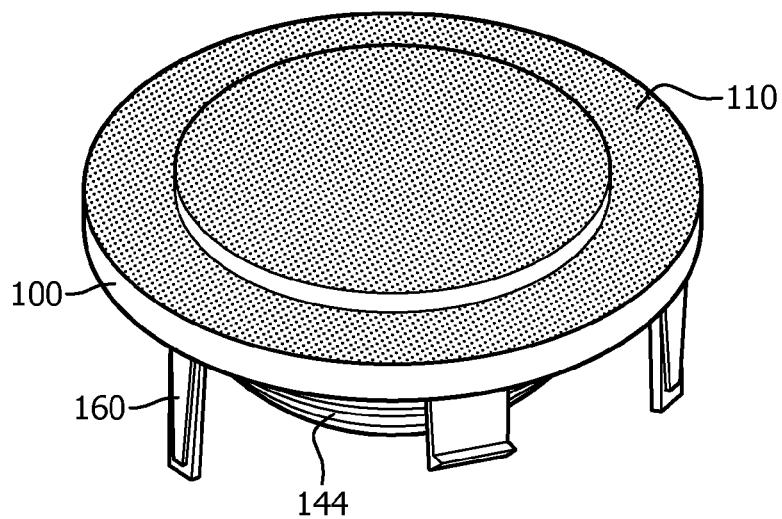
FIG. 5 schematically depicts a second perspective view of the lens of FIG. 4.

FIG. 4 and FIG. 5 show respective perspective views of a lens 100 according to an example embodiment of the present invention having a textured light exit surface 110 with a stepped profile as also shown in FIG. 1. FIG. 4 further shows the respective outer surfaces 134 and 144 of the inner annular reflective element 130 and the outer annular reflective element 140, as well as a part of the central lens portion 120. The lens 100 may further comprise a plurality of securing members 160 for engaging with a receiving member of a lighting device such that the lens 100 is secured in said lighting device.

At this point it is noted that the fact that certain combination of features are not explicitly shown in a single FIG. is not meant to exclude such a combination from the scope of the present invention. Any combination of the features of the lens 100 as shown in FIG. 1-5 respectively is contemplated to fall within the scope of the present invention.

Figure 6:
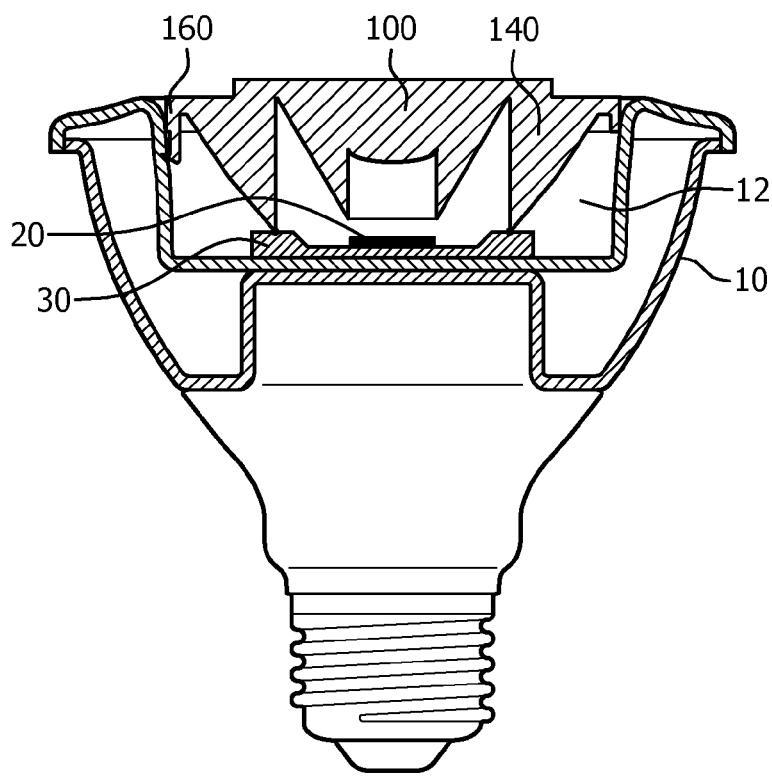
FIG. 6 schematically depicts a lighting device according to an embodiment of the present invention.

FIG. 6 schematically depicts an aspect of a lighting device 10 of the present invention. The lighting device 10 comprises a carrier 30 carrying at least one SSL element 20. In an embodiment, the carrier 30 comprising at least one SSL element 20 is a chip-on-board LED package although it should be understood that other arrangements, e.g. one or more SSL elements 20 such as LEDs mounted on a separate carrier, e.g. a printed circuit board, are equally feasible.

In an embodiment, the lighting device 10 comprises a cavity 12 over the carrier 30 in which the lens 100 is fitted. The lens 100 may be fitted in this cavity 12 in any suitable manner. For instance the cavity 12 may comprise a plurality of receiving members for receiving the securing members 160 of the lens 100 although other securing principles are equally applicable, e.g. using fastening members such as screws or the like.

As can be seen in FIG. 6, the outer annular reflective element 140 of the lens 100 is in physical contact with the carrier 30, such that the outer annular reflective element 140 envelopes the luminous surface defined by the one or more SSL elements 20 on the carrier 30. Consequently, substantially all luminous output of the one or more SSL elements 20 is captured by the central lens portion 120, the inner annular reflective element 130 and the outer annular reflective element 140 of the lens 100.

In an embodiment, the luminous area of the carrier 30 as defined by the one or more SSL elements 20 extends beyond the inner surface 132 of the inner annular reflective element 130, as previously explained. For instance, in a Par 30 light bulb the luminous area may have a diameter of around 10 mm, and the cavity 12 may have a 56 mm diameter and a height of 22 mm, such that the overall dimensions of the lens 100 are delimited by the cavity dimensions. This demonstrates that compact nature of the lens 100 according to embodiments of the present invention. In an embodiment, between 60-80%, e.g. 70%, of the luminous output of the lighting device such as a Par 30 light bulb is collimated by the central lens portion 120 and the inner annular reflective element 130, with the remaining output being collimated by the outer annular reflective element 140.

As a non-limiting example, the lighting device 100 may be a Par 30 light bulb having a beam angle of 14.6°, an efficiency of 89% and a Cd/lm ratio of 9.7. This compares favourably with prior art Par 30 light bulbs having either higher beam angles or lower Cd/lm ratios.

It is reiterated that in FIG. 6, the lighting device 10 is a light bulb by way of non-limiting example. It should be understood that the lens 100 according to embodiments of the present invention may be applied in any suitable lighting device. Moreover, the lighting device 10 may be a Par 30 light bulb or any other suitable type or size of light bulb. Other suitable light bulb sizes include but are not limited to GU10, MR11, MR16, AR111, Par38, BR30, BR40, R20, and R50 light bulbs to name but a few.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising at least one solid state lighting element and a lens which comprises:
    a light exit surface;
    a central lens portion opposite said light exit surface;
    an inner annular reflective element opposite said light exit surface and extending away from said light exit surface by a first distance, said inner annular reflective element delimiting said central lens portion; and
    a side surface defined by an outer annular reflective element opposite said light exit surface and extending away from said light exit surface by a second distance that is larger than the first distance such that the outer annular reflective element extends beyond the inner annular reflective element;
    wherein the inner annular reflective element and the outer annular reflective element are directly adjacent to each other;
    wherein the lens is placed over the at least one solid state lighting element such that the outer annular reflective element is in contact with a surface of the lighting device carrying the at least one solid state lighting element, wherein an outer surface of the outer annular reflective element is angled, wherein a luminous surface area of the solid state lighting element is enclosed by the outer annular reflective element; and
    wherein said luminous surface area extends beyond the central lens portion.

2. The lighting device of claim 1, wherein the central lens portion of the lens has a convex surface.

3. The lighting device of claim 1, wherein the central lens portion of the lens comprises a Fresnel refractive surface.

4. The lighting device of claim 1, wherein at least one of the inner annular reflective element and the outer annular reflective element comprises a tapered outer surface defined by a plurality of rings of facets.

5. The lighting device of claim 1, wherein said light exit surface of the lens comprises a stepped profile.

6. The lighting device of claim 1, wherein said light exit surface of the lens is textured.

7. The lighting device of claim 1, wherein the lens further comprises a microlens array on said light exit surface.

8. The lighting device of claim 1, wherein the lens is made of a polymer material.

9. The lighting device of claim 8, wherein the polymer material is polycarbonate or poly(methyl methacrylate).

10. The lighting device of claim 1, further comprising a cavity over said at least one solid state lighting element, said cavity housing said lens.

11. The lighting device of claim 1, wherein the at least one solid state lighting element on said carrier is a chip on board solid state lighting element.

12. The lighting device of claim 1, wherein the at least one solid state lighting element is a light emitting diode.

13. The lighting device of claim 1, wherein the lighting device has a beam angle not exceeding 15°.

\* \* \* \* \*